US010445286B1

United States Patent
Nijim et al.

(10) Patent No.: US 10,445,286 B1
(45) Date of Patent: Oct. 15, 2019

(54) SPECIFYING TITLES OF VIDEO ON DEMAND CONTENT FOR PROVISIONING ON A CONTENT DELIVERY NETWORK

(75) Inventors: Yousef Wasef Nijim, Roswell, GA (US); Jay Paul Langa, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 468 days.

(21) Appl. No.: 13/467,625

(22) Filed: May 9, 2012

(51) Int. Cl.
*G06F 15/16* (2006.01)
*H04N 7/173* (2011.01)

(52) U.S. Cl.
CPC ............ *G06F 15/16* (2013.01); *H04N 7/173* (2013.01)

(58) Field of Classification Search
CPC ............ G06F 17/03; G06F 3/04; G06F 15/16; H04N 7/173
USPC .................................. 705/40, 36 R; 709/204
See application file for complete search history.

(56) References Cited

U.S. PATENT DOCUMENTS

| | | | | |
|---|---|---|---|---|
| 6,021,397 | A * | 2/2000 | Jones et al. ................. | 705/36 R |
| 8,577,732 | B1 * | 11/2013 | Martin ............... | G06Q 30/0202 705/14.25 |
| 2001/0042785 | A1 * | 11/2001 | Walker et al. ................. | 235/379 |
| 2004/0117302 | A1 * | 6/2004 | Weichert et al. ............... | 705/40 |
| 2005/0278764 | A1 * | 12/2005 | Barr ...................... | G11B 27/036 725/100 |
| 2008/0071929 | A1 * | 3/2008 | Motte ................. | G06F 17/3089 709/246 |
| 2010/0011061 | A1 * | 1/2010 | Hudson .................. | D01D 5/423 709/204 |
| 2012/0084821 | A1 * | 4/2012 | Rogers ............... | H04N 21/2225 725/93 |
| 2013/0070093 | A1 * | 3/2013 | Rivera ................. | G11B 27/002 348/143 |

FOREIGN PATENT DOCUMENTS

CN 101958929 A * 1/2011

OTHER PUBLICATIONS

Alfred C. Weaver and Michael W. Condry. Distributing Internet Services to the Network's Edge. IEEE Transactions on Industrial Electronics, vol. 50, No. 3, pp. 404-411 (Jun. 2003).*

* cited by examiner

*Primary Examiner* — Virpi H Kanervo
(74) *Attorney, Agent, or Firm* — Merchant & Gould

(57) ABSTRACT

On demand content is delivered to a network edge server based on rules. A central storage, disposed at a head end of a content distribution system, stores content for distribution to users. A decision server, coupled to the central storage, collects information regarding business rules and usage of content by users and processes the collected business rules and usage of content by users to identify content for reprovisioning. A network edge server, coupled to the decision server, and which includes storage, receives and stores content identified by the decision server for reprovisioning from the central storage for distribution from the network edge server directly to the users.

20 Claims, 6 Drawing Sheets

SPECIFYING TITLES OF VIDEO ON DEMAND CONTENT FOR PROVISIONING ON A CONTENT DELIVERY NETWORK

FIELD OF THE INVENTION

This disclosure relates in general to content distribution systems, and more particularly to specifying titles of video on demand content for provisioning on a content delivery network.

BACKGROUND

Hybrid Fiber Coax (HFC) cable networks were originally built to deliver broadcast-quality TV signals to homes. The wide availability of such systems and the extremely wide bandwidth of these systems led to the extension of their functionality to include delivery of high-speed broadband data signals to end-users. Data over Cable System Interface Specifications (DOCSIS), a protocol elaborated under the leadership of Cable Television Laboratories, Inc., has been established as the major industry standard for two-way communications over HFC cable plants.

The basic elements of a DOCSIS-compliant cable network are the cable modem (CM), located on the subscriber's site, and the cable modem termination system (CMTS) and head end located in facilities operated by the cable service provider. The medium between the CMTS and the different CMs is a two-way shared medium, in which the downstream channels carry signals from the head-end to users and upstream channels carry signals from users to head-end. A CM is normally tuned to one upstream channel and the associated downstream channel. The upstream channel is an inherently shared medium in which slots are reserved using a contention system while the downstream is a broadcast dedicated link from the CMTS to the CM.

In recent years, packet-switched networks, such as the Internet, wireless communication, ADSL and CATV, have become more widespread. Packet-switched networks, such as networks based on the TCP/IP protocol suite, can distribute a rich array of digital content to a variety of client applications. It is often advantageous when distributing digital content across a packet-switched network to provide a distributed system that includes a plurality of servers dispersed throughout the distribution network, wherein the content is mirrored on the distributed servers. A more recent alternative to mirroring is content distribution networks (CDNs) that dynamically redirect content requests to an edge server situated closer to the client issuing the request.

As IP or packet-based solutions for providing content increases, the infrastructure for distributing content and services will be changing. For example, the infrastructure may need to evolve to support additional devices or different types of devices. Even for supporting set-top boxes, a different infrastructure may be used than that currently implemented.

Today, most content is maintained at a centralized back-office server, i.e., at the corporate level rather than in the network. For example, in the cable industry there are many different systems and/or service areas that are supported. The centralized location provides broad access for all subscribers. Thus, the central server services several content delivery networks (CDNs).

The CDN serve as relay servers located in respective regions, wherein the edge servers store a content that includes favorites of users. Thereby, by accessing the edge servers without directly accessing the archive server, the users may be able to download favorite content in a relatively short time. Although the edge servers store relatively popular content, the edge servers may not match actual users' preferences, in which case the users may have to directly access the archive server. Repeated occurrence of such a situation would increase the load on the archive server, make it difficult to maintain a given service quality, and lose opportunities to provide services for customers.

SUMMARY OF THE INVENTION

To overcome the limitations described above, and to overcome other limitations that will become apparent upon reading and understanding the present specification, embodiments for specifying titles of video on demand content for provisioning on a content delivery network are disclosed.

The above-described problems are solved by specifying titles of video on demand content for provisioning on a content delivery network are disclosed. Embodiments allow the popular assets to be chosen and placed on the edge, i.e., content delivery network (CDN), for easier access by customers. CDN storage is minimized resulting in reduced overhead cost and allows customers to quickly access the most popular titles.

An embodiment includes a method for delivering on demand content to an edge server based on rules. The method includes collecting information regarding business rules and usage of content by users, processing the collected business rules and usage of content by users to identify content to provide at the edge server and providing the identified content to the edge server for distribution directly to the users.

In another embodiment, a system for delivering on demand content to a network edge server based on rules is disclosed. The system includes central storage, disposed at a head end of a content distribution system, for storing content for distribution to users, a decision server, coupled to the central storage, for collecting information regarding business rules and usage of content by users and processing the collected business rules and usage of content by users to identify content for reprovisioning and a network edge server, coupled to the decision server, the network edge server including storage for receiving and storing content identified by the decision server for reprovisioning from the central storage for distribution from the network edge server directly to the users.

A computer readable medium including executable instructions which, when executed by a processor, delivers on demand content to a network edge server based on rules, is disclosed. The computer readable medium includes instructions executable by the processor to collect information regarding business rules and usage of content by users, to process the collected business rules and usage of content by users to identify content to provide at the edge server and to provide the identified content to the edge server for distribution directly to the users.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to specifying titles of video on demand content for provisioning on a content delivery network. Specifying titles of video on demand content for provisioning on a content delivery network allows the popular assets to be chosen from edge servers, i.e., content delivery network (CDN), for easier access by customers. CDN storage is minimized resulting in reduced overhead cost and allows customers to quickly access the most popular titles.

Figure 1:
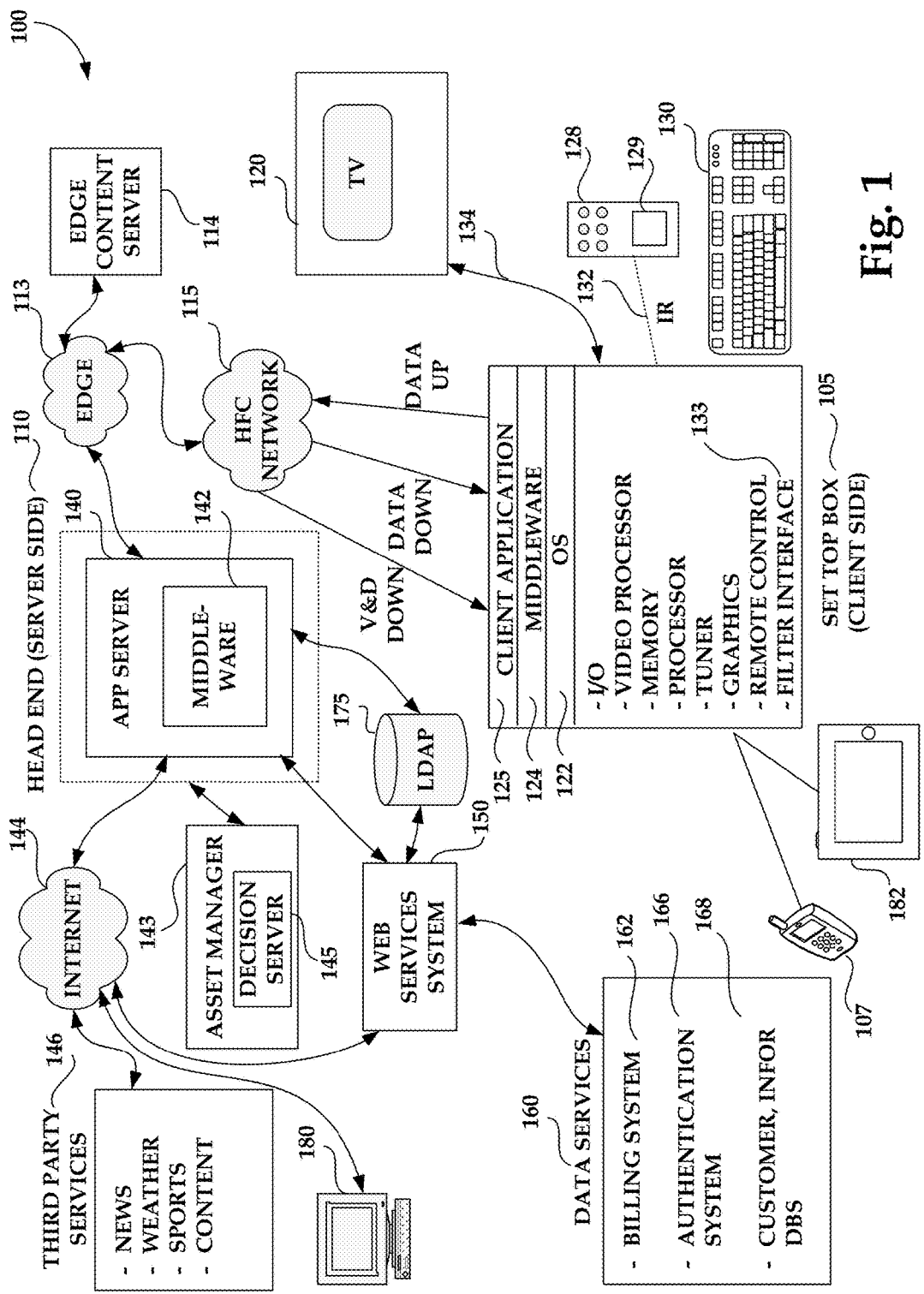
FIG. 1 is a simplified block diagram illustrating a cable television/services system (hereafter referred to as "CATV") architecture providing an operating environment according to an embodiment.

FIG. 1 is a simplified block diagram illustrating a cable television/services system 100 (hereafter referred to as "CATV") architecture providing an operating environment according to an embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of subscribers. Coaxial cable runs from the optical fiber feeders to each customer or subscriber. The functionality of the HFC network 115 allows for efficient bidirectional data flow between the client-side set-top box 105 and the server-side application server 140 of the embodiment.

The CATV system 100 is in the form of a distributed client-server computing system for providing video and data flow across a network edge 113 and the HFC network 115 from server-side services providers (e.g., cable television/ services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the network edge 113 and the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the network edge 113 and the HFC network 115 and from customers via input devices such as the remote control device 128, keyboard 130, or other computing device 180, such as a tablet/slate computer, smart phone, etc. STB 105 provides a filter interface 133 for presenting filtered programming and/or content via STB 105 on the TV 120. While the filter interface 133 may be implemented using STBs 105, 106, the person having ordinary skills in the art will understand that the filter interface 133 may be provided through wireless device 107, any type of network media device 182, or any device capable of interfacing with a STB 105 or in a server or other module on the head end side 110. Such devices may include DVRs, wireless phones, PCs, laptop computers, tablet/slate computers, media viewing devices, or equivalents thereof. Further, filter interface 133 may be provided through a STB. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 may be provided to allow a given software application to be executed by a variety of different operating systems. According to an embodiment, the middleware layer 124 may include a set of application programming interfaces (APIs) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. The middleware layer 142 of the server-side application server and the middleware layer 124 of the client-side STB 105 may format data passed between the client side and server side according to the Extensible Markup Language (XML).

According to one embodiment, the set-top box 105 passes digital and analog video and data signaling to the television 120 via a one-way communication transport 134. According to other embodiments, two-way communication transports may be utilized, for example, via high definition multimedia (HDMI) ports. The STB 105 may receive video and data from the server side of the CATV system 100 via the network edge 113 and the HFC network 115 through a video/data downlink and data via a data downlink. The STB 105 may transmit data from the client side of the CATV system 100 to the server side of the CATV system 100 via the network edge 113 and the HFC network 115 via one data uplink. The video/data downlink is an "in band" downlink that allows for digital and analog video and data signaling from the server side of the CATV system 100 through the network edge 113 and the HFC network 115 to the set-top box 105 for use by the STB 105 and for distribution to the television set 120. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., up to ten) of digital signals.

The data downlink and the data uplink, illustrated in FIG. 1, between the HFC network 115 and the set-top box 105 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the network edge 113 and the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the network edge 113 and the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content. An edge content server 114 may be provided at the network edge 114 for maintaining popular assets for easier access by customers. Storage capacity of the edge content server 114 is minimized thereby resulting in reduced overhead cost and allows customers to quickly access the most popular titles from the edge content server 114 rather than from a central location provided by the head end 110 of the CATV system. An asset manager 143 maintains content at the head end 110. The asset manager 143 may also include a decision server 145 for processing rules and other input to determine what content to push to the edge content server 114.

The application server 140 is a general-purpose computing system operative to assemble and manage data sent to and received from the client-side set-top box 105 via the network edge 113 and the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the network edge 113 and the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment, data obtained and managed by the middleware layer 142 of the application server 140 is formatted according to the Extensible Markup Language and is passed to the set-top box 105 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the network edge 113 and the HFC network 115 and the set-top box 105.

According to embodiments, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing, billing presentment and payment receipt.

A customer information database 168 may include general information about customers such as place of employment, business address, business telephone number, and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

Referring still to FIG. 1, web services system 150 is illustrated between the application server 140 and the data services 160. According to embodiments, web services system 150 serves as a collection point for data requested from each of the disparate data services systems comprising the data services 160. According to embodiments, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

An authentication system 166 may include information such as secure user names, subscriber profiles, subscriber IDs, and passwords utilized by customers for access to network services. As should be understood by those skilled in the art, the disparate systems 150, 162, 166, 168, 175 may be integrated or provided in any combination of separate systems, wherein FIG. 1 shows only one example.

Figure 2:
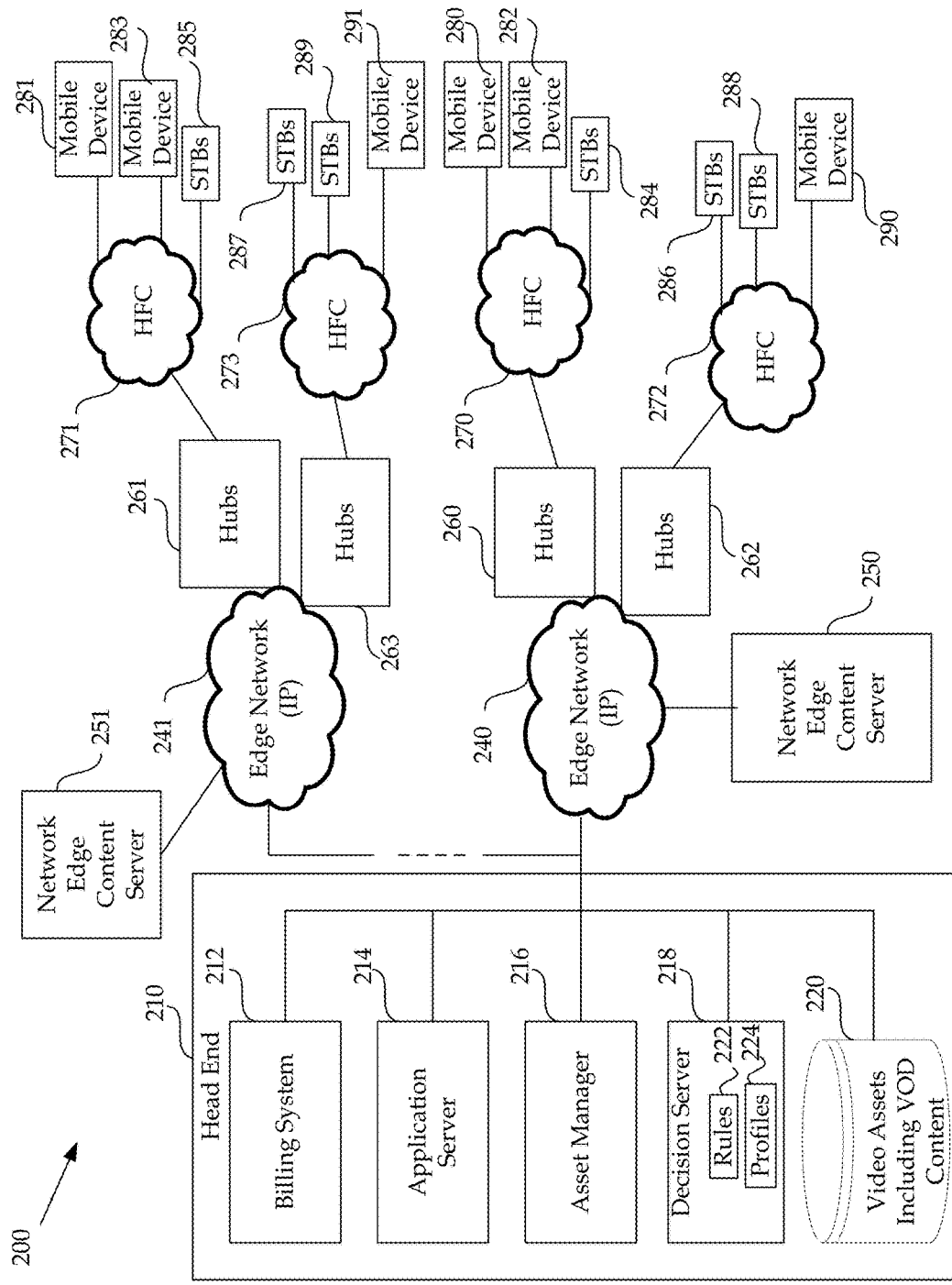
FIG. 2 is a simplified block diagram showing network edge servers disposed in the distribution network according to an embodiment.

FIG. 2 is a simplified block diagram 200 showing network edge servers disposed in the distribution network according to an embodiment. In FIG. 2, a head end 210 provides the systems for managing the content distribution system. The head end includes a billing system 212, an application server 214, an asset manager 216, a decision server 218 and memory 220 for storing video assets including video-on-demand (VOD) content. The head end 210 is coupled to a plurality of edge networks 240, 241. Each of the edge networks 240, 241 include at least one network edge content server 250, 251 for providing the content delivery network. Each edge network 240, 241 distribute content through hubs 260, 261, 262, 263 and hybrid fiber coax networks 270, 271, 272, 273 to media devices 280, 281, 283, 284, 285, 286, 287, 288, 289, 290, 291.

The decision server 218 provides an automated process that is based on the rules, e.g., usage and other business rules, to allow broad access to content placed on the content delivery network (CDN) at the network edge content servers 250, 251, rather than maintaining content in storage 220 located at a centralized location. In contrast to a central location, the network edge servers 250, 251 are located outside and typically downstream from centralized locations and are accessible by users via the Internet. Content available at the network edge servers 250, 251 allows for easier access by the customers. Latency issues are eliminated by maintaining content at the network edge servers 250, 251. In addition, receiving and interacting with the network edge servers 250, 251 is quicker than having to request information be delivered directly from the storage 220 at the centralized location. Users are able to communicate with the network edge servers 250, 251 using any IP-based device, such as handheld devices 280, 281, 282, 283, 290, 291 and/or any other sort of IP-based set-top boxes 284, 285, 286, 287, 288, 289.

The decision server 218 determines what assets are transferred or reprovisioned to the CDNs 240, 241 and how long such titles should be maintained at the network edge servers 250, 251 of the CDN 240, 241. Assets stay on the network edge servers 250, 251 of the CDNs 240, 241 until the decision server removes them. Nevertheless, content is still stored in the storage 220 at the central location. Most business rules will be pulled by the decision server 218 that processes data to control access to content by the CDNs 240, 241. However, marketing data may override content push decisions.

The processing by the decision server 218 is based on modeling the behavior of requests, type and number of supported devices, and the duration (length of time) that the asset will remain on the network edge servers 250, 251 of the CDNs 240, 241 versus storage 220 at the central location. The decision server 218 works both ways in moving assets to the network edge servers 250, 251 of the CDNs 240, 241 and removing content from the network edge servers 250, 251 of the CDNs 240, 241 based on usage and the availability of other popular titles.

Based on certain rules, content is placed on the network edge servers 250, 251 of the CDNs 240, 241. The network edge servers 250, 251 of the CDNs 240, 241 control access to content requested by users that resides on the network edge servers 250, 251. Rules are used to determine what content is placed at the network edge servers 250, 251 of the CDNs 240, 241 and to control access to the content at the network edge servers 250, 251 of the CDNs 240, 241. For example, business rules, such as marketing, may be used to determine access to content. Marketing may determine what titles need to be pushed to the network edge servers 250, 251 of the CDNs 240, 241 to provide customers easy access these titles. Each business rule has a different weight factor partially based on calculating the weight and partially based on the importance of the business rule as directed by the administrator.

The network edge servers 250, 251 of the CDNs 240, 241 may also enable ease of browsing, navigating and streaming of content at the network edge servers 250, 251 of the CDNs 240, 241. In addition, the rules 222 may include usage rules that are used to determine what movies are popular, what are the box office statistics for certain movies, etc. Choosing the popularity of an asset will be based on different business rules and statistical calculation requests from customers. The decision server 218 may be provided different rules 222, such as marketing recommendations, box office revenues, popularity in the theaters, a recommendation engine, popularity per device (some titles are more popular on different devices such as smart phones, tablets, computers, or TVs), etc.

Different regions may also have different habits of consuming content. The rules 222 are provided to decision server 218 for determining what content to provide at the network edge servers 250, 251 of the CDNs 240, 241. The content stored at the network edge servers 250, 251 of the CDNs 240, 241 also takes into consideration how many titles are available from the centralized location, what the viewing habits the customers have, etc. Rather than being user-centric based on individual user profiles, the profiles 224 used are specific for the area serviced by the network edge servers 250, 251 of the CDNs 240, 241.

The profiles 224 used may also take into account the particular devices that have been used to access content and the frequency associated with each device type. Thus, if customers are watching more on a particular device, more titles that are formatted for that device may be pushed to the network edge servers 250, 251 of the CDNs 240, 241.

The profiling also allows enhancement and improvement in the clustering of users. For example, different edge networks 240, 241 may serve different clusters of users. Content may also be pushed to network edge servers 250, 251 differently. Once a decision is made regarding which title should be pushed or stored to the network edge servers 250, 251 of the CDNs 240, 241 that title is obtained from the central location. Titles stored at the central location are not formatted based on the type of device. Rather, a single title in a single format is stored at the central location. Accordingly, a title has to be processed to reformat and repackage the content. At this time, advertising may be inserted based on the determined device type. Therefore, network edge servers 250, 251 that service a particular device requesting content will be provided content formatted for that type of device.

Content provided to the network edge servers 250, 251 of the CDNs 240, 241 will be associated with a number dictating the number of days the content will maintain on the network edge servers 250, 251 of the CDNs 240, 241. However, this number may be continually or periodically adjusted based on the usage of the content. Accordingly, a title on the network edge servers 250, 251 of the CDNs 240, 241 may be replaced if the usage for that title has been declining. The network edge servers 250, 251 collect information on the usage of content and collects information about the users.

Figure 3:
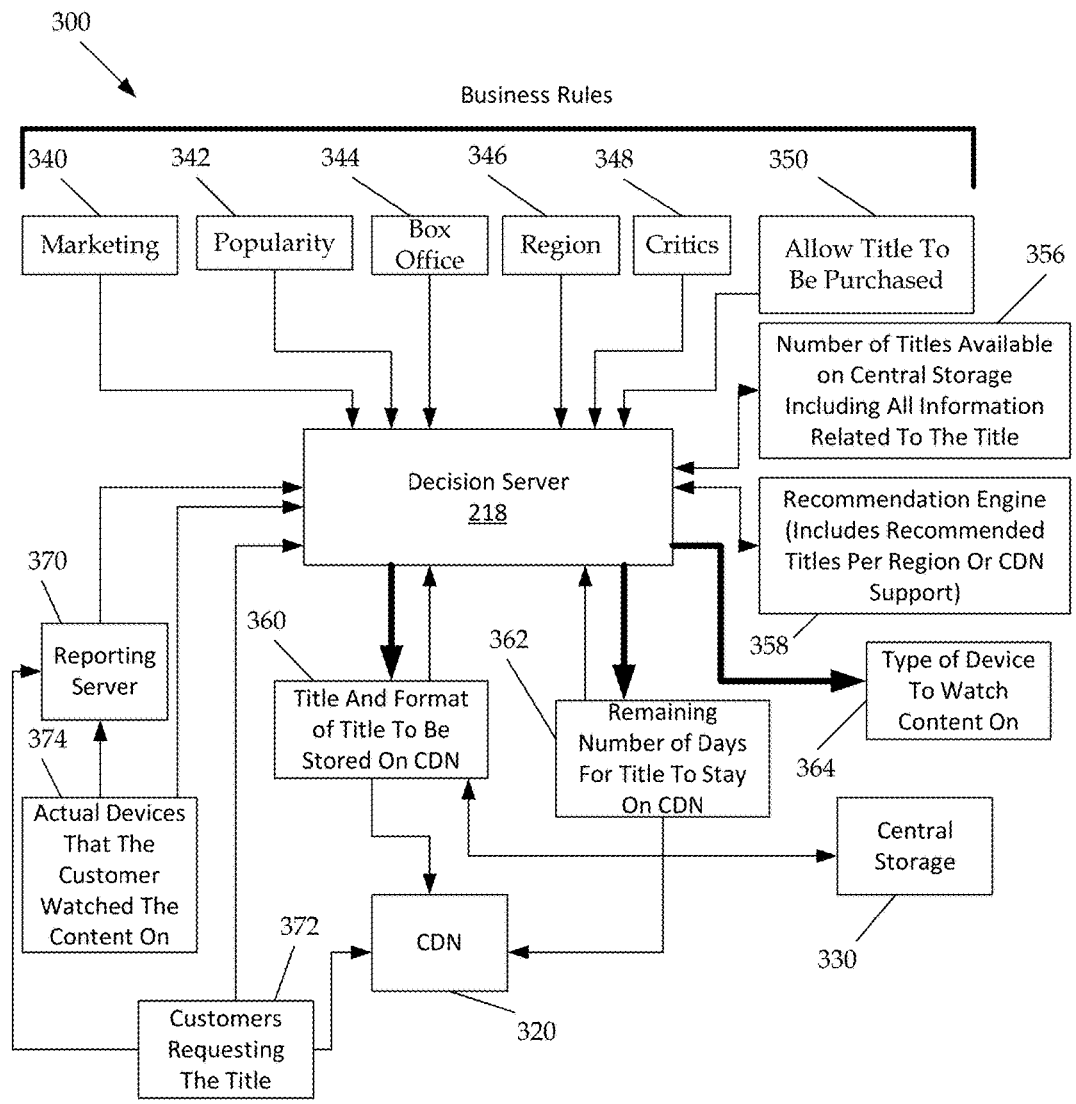
FIG. 3 is a block diagram illustrating the operation of the system for providing content at servers of a content distribution network according to an embodiment.

FIG. 3 is a block diagram 300 illustrating the operation of the system for providing content at servers of a content distribution network according to an embodiment. In FIG. 3, a decision server 218 is used to predict or choose OD titles to be placed on the CDN 320, e.g., at a network edge server, rather than the central storage 330, which includes a much larger storage capacity. Marketing 340 may specify title to include on the CDN based on marketing strategy. In addition, input to the decision server 218 may include popularity information 342, such as the number of requests or expected requests for the asset to be either purchased or rented. The number of expected requests to be used as an input is modeled and is updated in real time as the actual number of requests is calculated. Usage rules may also be provided that provide box office statistics 344 for certain movies, etc. Different regions may also have different habits of consuming content and therefore region information 346 may be provided to the decision server 218. Information from critics 348 may also be provided to the decision server 218. Any other information that may be used to generate by the decision server 218 a decision for providing content to the CDN 320 may be provided to the decision server 218, including information relating to whether a title maybe purchased 350.

Management of the titles on the CDN 320 is facilitated by providing the decision server 218 management data 356, including the number of titles available on central storage 330 as well as any other information related to the title. A recommendation engine 358 processes the information obtained by the decision server 218 to recommend titles for providing to the CDN 320, including recommended titles per region.

The outputs of the decision server 218 will be the title and the format of a title to be placed on the CDN 360, the expected device(s) that the customer will use to watch this type of content 362, and the number of days the asset will remain on the CDN 364. These outputs will be updated regularly based on the actual input data that gets updated in real time.

A reporting server 370 obtains information from customers requesting the title 372, including how many customers requested the title, how many times the title was watched in total, when did users watch a certain title, etc. There may be titles that are popular in the morning and different titles that are popular in the evening. In addition, the reporting server 370 obtains information regarding devices used to watch the requested content 374. The reporting server provides reports on the obtained data to the decision server 218. The reporting server 370 produces reports relevant to the usage, bandwidth, operations, etc., and provides such reports to the decision server 218. Data relevant to certain edge servers, CDNs, and/or titles, as well as information regarding customer usage and consumption of content, is collectively obtained. The reports provided by the reporting server 370 are formatted for use by the decision server 218.

The decision server 218 provides an adaptive process by adjusting what titles are maintained at the CDN 320. For example, titles that do not reflect the business rules may be removed from the CDN 320 by the decision server 218. Further, marketing may override the other business rules. Likewise, adjustments may be made to number the inputs, especially the number of requests, along with the business rules that impact the number of days the asset remains on the CDN 320, the number and type of devices, etc. Adjusting and adapting the inputs based on the actual values and recalculating provides advantages in terms of efficiency, accuracy and strategy.

The prediction process performed by the decision server 218 may be implemented as a closed loop process where the output is continuously adjusted based on the changes in the number of requests per day, devices used to watch the content, and the duration history where the number of days located on the CDN 320 is accounted for. As data changes, the content provided to a CDN 320 is updated, e.g., some titles may be moved off the CDN 320 and other titles may be moved to the CDN 320. Marketing may specify any title to remain on the CDN 320 for a predetermined number of days. The decision server 218 adjusts to work with the remaining storage at a CDN 320.

Decisions for pushing or reprovisioning content to a CDN 320 by the recommendation engine 358 may be based on statistical modeling of the information that has been captured by the decision server 218. At the central storage 330, categorization and clustering may be applied. Recommendations for providing the CDN 320 titles may also be based on linear prediction, an adaptive statistical method such as Multiple Inputs Multiple Outputs (MIMO) that is widely used in wireless communication for allocating resources, gaming algorithms to predict or model the behavior of the inputs, etc. Anything that is overwritten by marketing and stored at a CDN 320 will reduce the available storage capacity. Thus, the decision server 218 must readjust the titles pushed to the CDN 320 based on the actual storage capacity available at the CDN 320.

Figure 4:
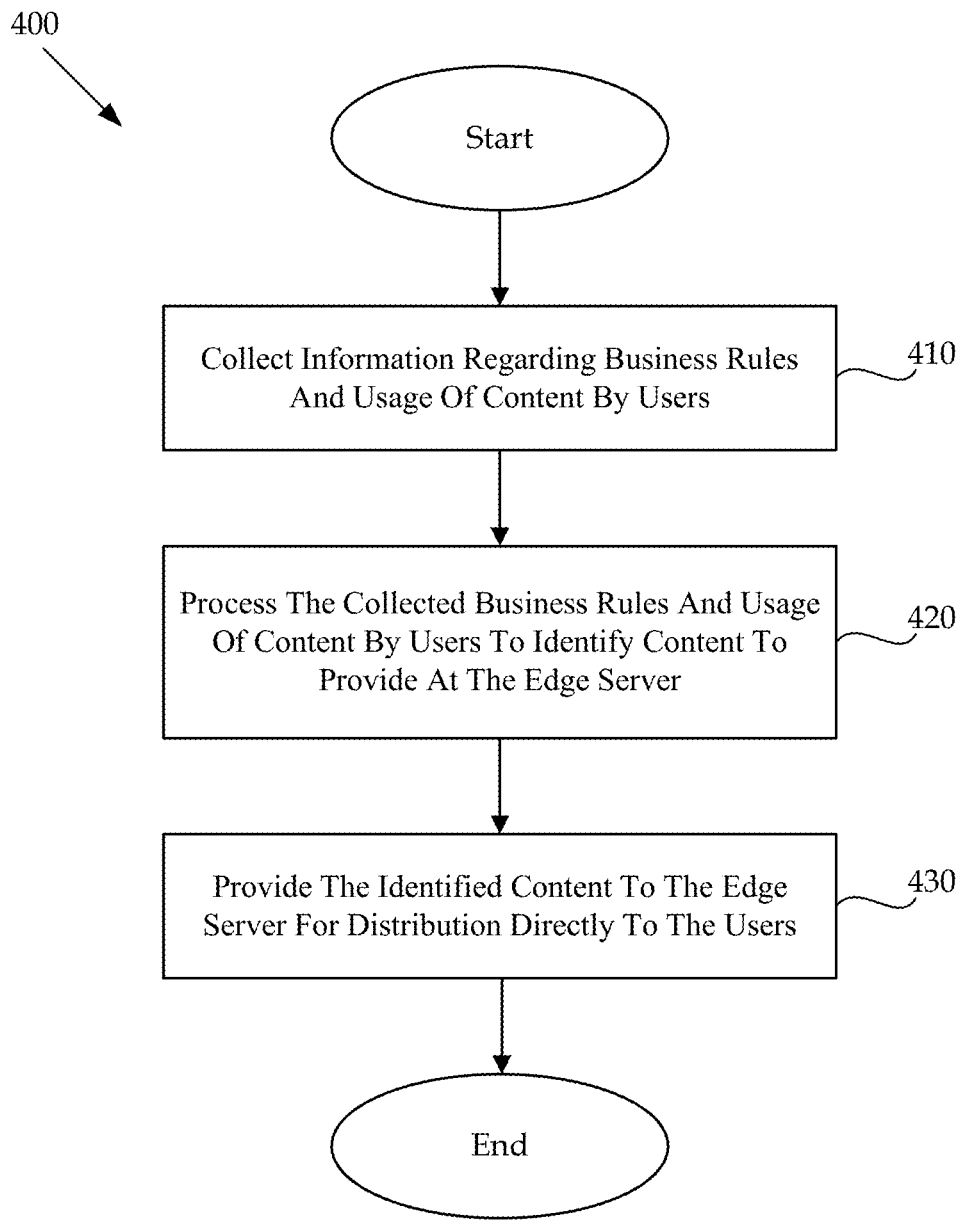
FIG. 4 is a flow chart of a method for specifying titles of video on demand content for provisioning on a content delivery network according to an embodiment.

FIG. 4 is a flow chart 400 of a method for specifying titles of video on demand content for provisioning on a content delivery network according to an embodiment. In FIG. 4, information regarding business rules and usage of content by users is collected (410). The collected business rules and usage of content by users is processed to identify content to provide at the edge server (420). The identified content is provided to the edge server for distribution directly to the users (430).

Figure 5:
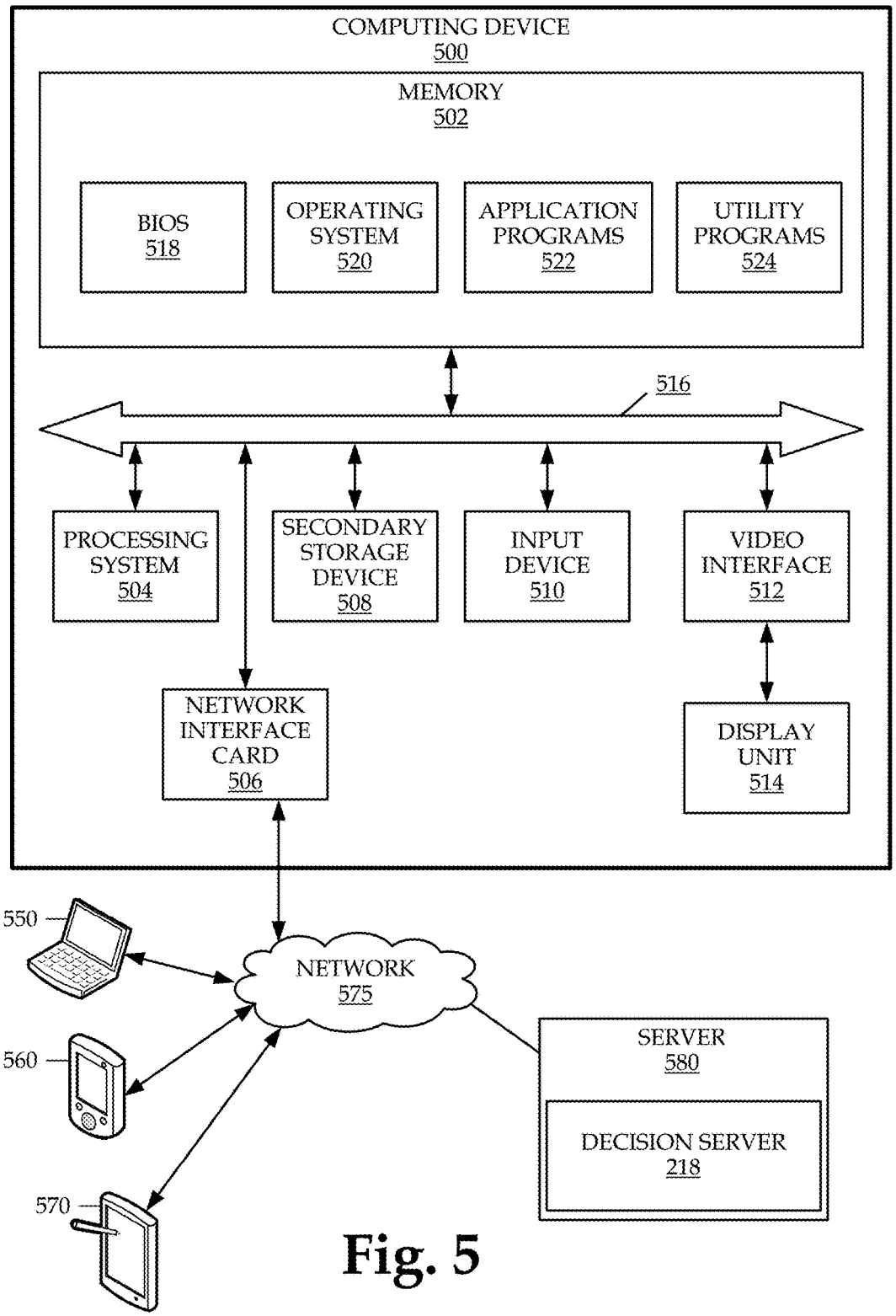
FIG. 5 is a block diagram illustrating example physical components of a computing device and a system architecture for specifying titles of video on demand content for provisioning on a content delivery network.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. FIGS. 4-6 and the associated descriptions provide a discussion of a variety of operating environments in which embodiments may be practiced. However, the devices and systems illustrated and discussed with respect to FIGS. 5-6 are for purposes of example and illustration and are not limiting of a vast number of computing device configurations that may be utilized for practicing embodiments, described herein. FIG. 5 is a block diagram illustrating example physical components of a computing device 500 with which embodiments may be practiced. In some embodiments, the decision server 218 may be implemented using one or more computing devices like the computing device 500. It should be appreciated that in other embodiments, the decision server 218 may be implemented using computing devices having hardware components other than those illustrated in the example of FIG. 5.

FIG. 5 is a block diagram illustrating example physical components of a computing device 500 with which embodiments may be practiced. In some embodiments, the decision server 218 may be implemented using one or more computing devices like the computing device 500. It should be appreciated that in other embodiments, the decision server 218 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules.

The memory 502 includes one or more computer-readable storage media capable of storing data and/or computer-executable instructions. According to one embodiment, the decision server 218 may be stored locally on computing device 500. Memory 502 thus may store the computer-executable instructions that, when executed by processor 504, cause the decision server 218 to allow broad access to content placed on a content delivery network (CDN) at a network edge content server rather than maintaining content in storage located at a centralized location as described above with reference to FIGS. 1-4.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users, for example, the decision server 218. The memory 502 also stores one or more utility programs 524 that, when executed by the processing system 504, cause the computing device 500 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 5 may be integrated onto a single integrated circuit. When operating via such a single integrated circuit, the functionality, described herein, with respect to the decision server 218 may be operated via application-specific logic integrated with other components of the computing device/system 500 on the single integrated circuit.

A server 580 may provide the decision server 218 to client devices. As one example, server 580 may be a web server providing the decision server 218 over the web. Server 580 may provide the decision server 218 over the web to clients through a network 575. Examples of clients that may obtain the decision server 218 include computing device 550, which may include any general purpose personal computer (such as computing device 500), a tablet computing device 570 and/or mobile computing device 560, such as smart phones.

Figures 6A, 6B:
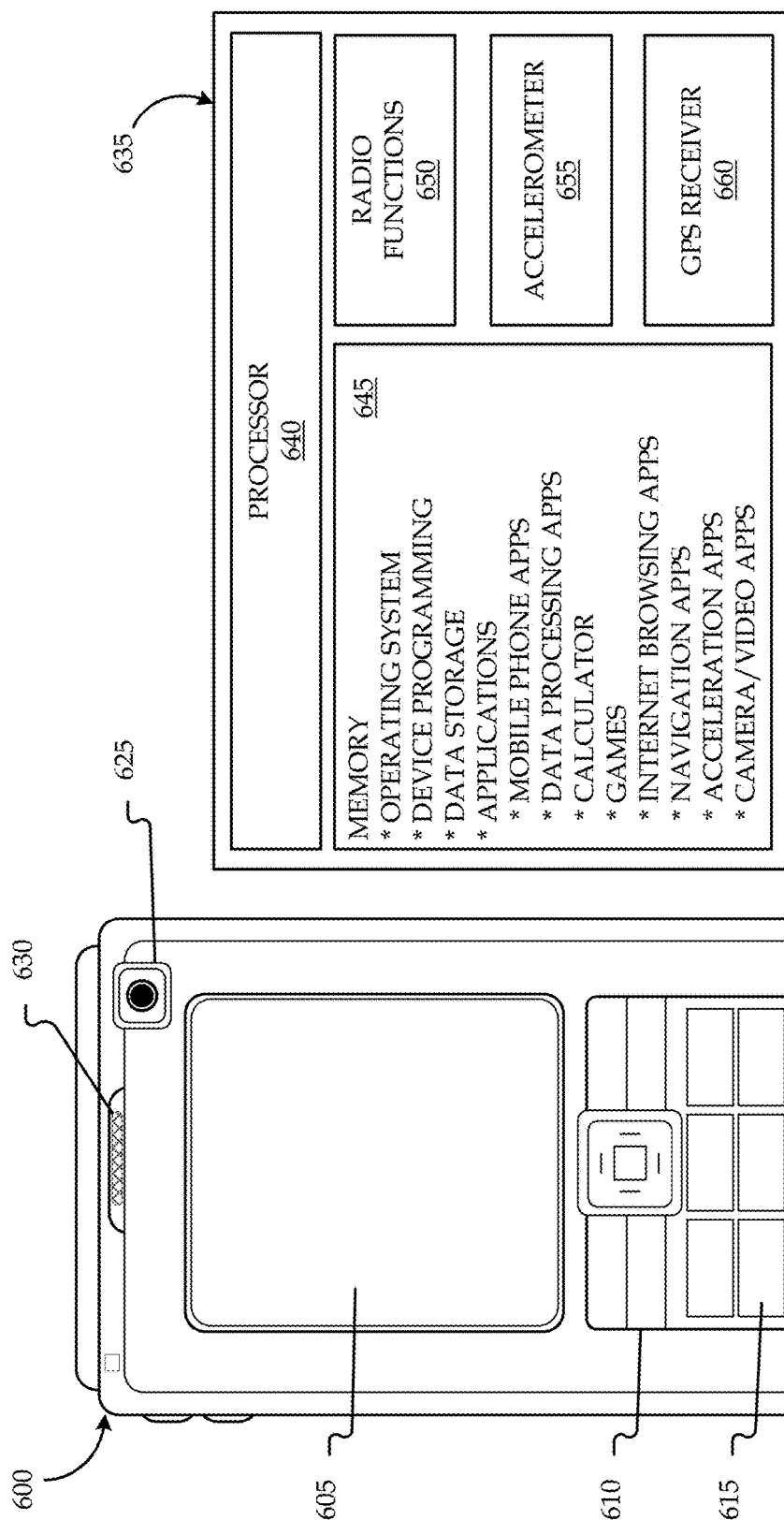
FIGS. 6a-b illustrate computing environments with which embodiments may be practiced.

FIGS. 6*a-b* illustrate a suitable mobile computing environment, for example, a mobile computing device 600, a smart phone, a tablet personal computer, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 625 functionality associated with the mobile computing device, or any other suitable input means. Data may be output via the device 600 via any suitable output means, including but not limited to, display on the display screen 605, audible output via an associated speaker 630 or connected earphone system, vibration module for providing tactile output, and the like.

Referring now to FIG. 6*b*, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network. Radio functions 650 may be utilized to communicate with a wireless or WIFI-based positioning system to determine a device's 600 location.

Although described herein in combination with mobile computing device 600, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-6. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for improving a user device in communication with a content distribution system by delivering video on demand content to a network edge server based on rules, comprising:
originating, by an application server, content from a central location having a central storage of content to be distributed to users via the network edge server;
collecting, by a decision server coupled to the central storage of content, business rules;
collecting, by the decision server, usage of content by the users, wherein collecting the usage of content by the users comprises identifying users who are requesting specific content;
generating, by the decision server, an area profile that identifies a plurality of users who are within an area of service of the network edge server, wherein the generated area profile is operable to identify different habits of consuming the content by the plurality of users who are within the area of service of the network edge server;
processing, by the decision server, the collected business rules and the collected usage of content by the plurality of users who are within the area of service of the network edge server;
identifying, by the decision server, content to be reprovisioned from the central storage of content to the network edge server based on the generated area profile and based on the processed collected business rules and the processed collected usage of content by the plurality of users who are within the area of service of the network edge server, wherein an access to the identified content from the central storage of content to be reprovisioned is controlled by the network edge server;
reprovisioning, by the decision server, the identified content from the central storage of content to the network edge server to be distributed directly to the users from the network edge server situated at the area of service;
storing the identified content from the central storage of content onto the network edge server; and
distributing, by the network edge server coupled to the decision server, the identified content directly to the users who are within the area of service of the network edge server.

2. The method of claim 1, wherein the reprovisioning the identified content to the network edge server comprises reprovisioning the identified content to the network edge server for a set number of days.

3. The method of claim 1, wherein the identifying content comprises identifying content based on available storage at the network edge server and based on popularity of content, and wherein the available storage and the usage of content are adaptively monitored for management and optimization of content provided to the network edge server.

4. The method of claim 3, wherein the identifying content based on the popularity of content comprises identifying content popular at a predetermined time of day.

5. The method of claim 1, wherein the identifying content comprises identifying content to provide to the network edge server based on marketing information.

6. The method of claim 1, wherein the identifying content comprises identifying content to provide to the network edge server based on popularity of content, box office statistics, regional specific information, information from critics, and management data.

7. The method of claim 1, wherein the providing the identified content directly to the users comprises providing content associated with an identified title and an identified format of a title.

8. The method of claim 1, wherein the providing the identified content directly to the users comprises adjusting titles maintained at the network edge server.

9. The method of claim 1, wherein the identifying content comprises identifying content to provide content to the network edge server based on statistical modeling of the usage of content comprising the area profile.

10. The method of claim 1, wherein the processing the collected business rules and the collected usage of content by the plurality of users who are within the area of service of the network edge server further comprises identifying a supplementary content to provide in conjunction with the reprovisioned identified content.

11. The method of claim 10, wherein the supplementary content comprises video-on-demand services.

12. The method of claim 1, wherein the area profile further comprises information identifying the plurality of users requesting content and a frequency of the requests.

13. A system for improving a user device in communication with a content distribution system by delivering video on demand content to a network edge server based on rules, comprising:
a central storage located in a central location and disposed at a head end of the content distribution system, configured to:
store content to be distributed to users, wherein the content originates from the central storage of content to be distributed to the users via the network edge server;
an application server, configured to:
originate content from the central storage of content to be distributed to users other than via the network edge server;
a decision server coupled to the central storage of content, configured to:
collect business rules and usage of content by users, wherein collecting the usage of content by users comprises identifying users who are requesting specific content;
generate an area profile that identifies a plurality of users who are within an area of service of the network edge server, wherein the generated area profile is operable to identify different habits of consuming the content by the plurality of users who are within the area of service of the network edge server;

process the collected business rules and the collected usage of content by the plurality of users who are within the area of service of the network edge server;

identify content to be reprovisioned from the central storage of content to the network edge server based on the generated area profile and based on the processed collected business rules and the processed collected usage of content by the plurality of users who are within the area of service of the network edge server, wherein an access to the identified content from the central storage of content to be reprovisioned is controlled by the network edge server; and reprovision the identified content from the central storage of content to the network edge server to be distributed directly to the users from the network edge server situated at the area of service; and the network edge server coupled to the decision server, configured to:

receive and store the identified content to be reprovisioned from the central storage of content; and distribute the identified content directly to the users who are within the area of service of the network edge server.

14. The system of claim 13, wherein the decision server is further configured to:

determine a set number of days for reprovisioning content at the network edge server.

15. The system of claim 13, wherein the decision server is further configured to:

identify content to be reprovisioned based on available storage at the network edge server and based on popularity of content; and adaptively monitor available storage and content usage for management and optimization of content provided to the network edge server.

16. The system of claim 15, wherein the decision server is further configured to:

identify content based on popularity by identifying content popular at a predetermined time of day.

17. The system of claim 13, wherein the decision server is further configured to:

identify content to provide to the network edge server based on marketing information.

18. The system of claim 13, wherein the decision server is further configured to:

identify content to reprovision at the network edge server by identifying content to provide the network edge server based on collected information including popularity of the content, box office statistics, regional specific information, information from critics, management data, and statistical modeling of collected information.

19. The system of claim 13, wherein the decision server is further configured to:

adjust titles maintained at the network edge server.

20. A non-transitory computer readable medium including executable instructions which, when executed by a processor, improves a user device in communication with a content delivery network by delivering video on demand content to a network edge server based on rules, by:

originating, by an application server, content from a central location having a central storage of content to be distributed to users via the network edge server;

collecting, by a decision server coupled to the central storage, business rules;

collecting, by the decision server, usage of content by the users, wherein collecting the usage of content by the users comprises identifying users who are requesting specific content;

generating, by the decision server, an area profile that identifies a plurality of users who are within an area of service of the network edge server, wherein the generated area profile is operable to identify different habits of consuming the content by the plurality of users who are within the area of service of the network edge server;

processing, by the decision server, the collected business rules and the collected usage of content by the plurality of users who are within the area of service of the network edge server;

identifying, by the decision server, content to be reprovisioned from the central storage of content to the network edge server based on the generated area profile and based on the processed collected business rules and the processed collected usage of content by the plurality of users who are within the area of service of the network edge server, wherein an access to the identified content from the central storage of content to be reprovisioned is controlled by the network edge server;

reprovisioning, by the decision server, the identified content from the central storage of content to the network edge server to be distributed directly to the users from the network edge server situated at the area of service;

storing the identified content from the central storage of content onto the network edge server; and distributing, by the network edge server coupled to the decision server, the identified content directly to the users who are within the area of service of the network edge server.

* * * * *